(12) United States Patent
Tasaki et al.

(10) Patent No.: US 6,359,285 B1
(45) Date of Patent: Mar. 19, 2002

(54) STIMULABLE PHOSPHOR SHEET (75) Inventors: Seiji Tasaki; Katsuhiro Kohda, both of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/525,481

(22) Filed: Mar. 15, 2000

(30) Foreign Application Priority Data

Mar. 15, 1999 (JP) ............................... 11-068966

(51) Int. Cl.$^7$ .................. H05B 33/00; G03G 5/10; A61B 6/00; G01N 23/04
(52) U.S. Cl. ................. 250/484.4; 250/473.1; 250/581; 250/582
(58) Field of Search .................. 250/484.4, 473.1, 250/581, 582, 484.3, 472.1, 580, 584, 585, 586

(56) References Cited

U.S. PATENT DOCUMENTS 6,246,063 B1 * 6/2001 Fukui ................. 250/484.4

* cited by examiner

Primary Examiner—Hung Xuan Dang
(74) Attorney, Agent, or Firm—Sughrue Mion, PLLC

(57) ABSTRACT

A stimulable phosphor sheet for a radiation image recording and reproducing method comprising the steps of recording a radiation image as a latent image, irradiating the latent image with stimulating rays to release stimulated emission, and electrically processing the emission to reproduce the radiation image, has partitions that divide the phosphor sheet on its plane to give plural sections, and stimulable phosphor-incorporated areas in the sections, wherein the phosphor-incorporated areas have a light-scattering length of 20 to 100 μm and a light-absorption length of 1,000 μm or longer, while the partitions have a light-scattering length of 0.05 to 20 μm and a light-absorption length of 1,000 μm or longer, under the condition that a ratio of the light-scattering length of the phosphor-incorporated areas to that of the partitions is 3.0 or more.

14 Claims, 6 Drawing Sheets

STIMULABLE PHOSPHOR SHEET

FIELD OF THE INVENTION

The present invention relates to a stimulable phosphor sheet employable in a radiation image recording and reproducing method utilizing stimulated emission produced by a stimulable phosphor.

BACKGROUND OF THE INVENTION

As a method replacing a conventional radiography using a combination of a radiographic film and radiographic intensifying screens, a radiation image recording and reproducing method utilizing a stimulable phosphor was proposed and is practically employed. The method employs a stimulable phosphor sheet comprising a stimulable phosphor layer (i.e., radiation image storage panel) provided on a support, and the procedure of the method comprises the steps of causing the stimulable phosphor of the stimulable phosphor sheet to absorb radiation energy having passed through an object or having radiated from an object; sequentially exciting the stimulable phosphor with an electromagnetic wave such as visible light or infrared rays (hereinafter referred to as "stimulating rays") to release the radiation energy stored in the phosphor as light emission (i.e., stimulated emission); photoelectrically detecting the emitted light to obtain electric signals; and reproducing the radiation image of the object as a visible image from the electric signals. The stimulable phosphor sheet thus processed is subjected to a step for erasing a radiation image remaining therein, and then stored for the next recording and reproducing procedure. Thus, the stimulable phosphor sheet can be repeatedly employed.

In general, a support and a protective film are provided on the top and bottom surfaces of the stimulable phosphor sheet, respectively. The stimulable phosphor sheet generally comprises a binder and stimulable phosphor particles dispersed therein, but it may consist of agglomerated phosphor without binder. The stimulable phosphor sheet containing no binder can be formed by the deposition process or firing process. Further, the stimulable phosphor sheet comprising agglomerated phosphor soaked with a polymer is also known. For the aforementioned method, any types of the stimulable phosphor sheets are employable.

The radiation image recording and reproducing method is often used in radiography for medical diagnosis. In that case, it is especially desired to obtain a radiation image of high quality (particularly, high sharpness for high resolution) by applying a small dose of radiation. Therefore, the stimulable phosphor sheet is required to have high sensitivity and to provide a radiation image of high quality.

The sharpness of tradiation image is mainly affected by diffusion or scattering of the stimulating rays in the stimulable phosphor sheet. The procedure for reading the latent image comprises the steps of sequentially scanning a beam of the stimulating rays on the surface of the stimulable phosphor sheet to induce the stimulated emission, and successively detecting the stimulated emission. If the stimulating rays diffuse or scatter (horizontally in particular) on the plane of the phosphor sheet, it excites the phosphor not only at the target spot but also in its periphery. Consequently, the stimulated emission emitted from the target position is collected together with that from the periphery. Such contamination of the emissions impairs the sharpness of the resulting radiation image.

For avoiding the diffusion or scattering of the stimulating rays, it has been proposed to divide the plane of the stimulable phosphor sheet into small sections (cells) with a partition capable of reflecting the stimulating rays.

Japanese Patent Provisional Publication No. 59-202100 discloses a stimulable phosphor sheet having a honey-comb structure consisting of many small cells filled with a stimulable phosphor. The phosphor sheet comprises a substrate and a stimulable phosphor layer provided thereon, and the honey-comb structure sectioned with a partition is further provided on the phosphor layer.

Japanese Patent Provisional Publication No. 62-36599 discloses a stimulable phosphor sheet employing a support provided with many hollows regularly arranged on one surface. The hollows are filled with a stimulable phosphor, and the ratio of depth to diameter of each hollow is 3.5 or more.

Japanese Patent Provisional Publication No. 2-129600 discloses a stimulable phosphor sheet (i.e., radiation image storage panel) employing a support plate having many holes vertically bored and filled with a stimulable phosphor.

In these known stimulable phosphor sheets employing a support or substrate provided with many cells (i.e., holes or hollows) incorporated with a stimulable phosphor, a part of the support or substrate serves as a partition for reflecting the stimulating rays to prevent diffusion of the stimulating rays.

In the stimulable phosphor sheet having the cells, the partition preferably has a small thickness so that the stimulable phosphor-incorporated area is formed as large as possible. However, it is necessary to incorporate a light-absorbing material into a partition if the partition is made to have a small thickness, maintaining the light-intercepting property. The incorporation of the light-absorbing material into the partition decreases efficiency of recovery of the stimulated emission. If the thickness of the partition is increased, the amount of stimulable phosphor which can be incorporated into the stimulable phosphor sheet decreases and hence an enough amount of radiation energy is absorbed by the phosphor sheet. It can be considered to increase the thickness of the stimulable phosphor layer so as to incorporate an enough amount of the stimulable phosphor. However, the radiation energy hardly reaches the stimulable phosphor in the bottom portion in the phosphor layer having the increased thickness. Moreover, the stimulated emission produced in the bottom portion is not efficiently recovered from the surface of the stimulable phosphor sheet. For these reasons, there is not known a stimulable phosphor sheet that has a cell structure and gives a reproduced radiation image of satisfactorily high quality.

Accordingly, the present invention has an object to provide a stimulable phosphor sheet which gives a reproduced radiation image of high quality, particularly, in its sharpness.

The invention further has an object to provide a stimulable phosphor sheet that has high sensitivity and gives a reproduced radiation image of high quality, particularly, in its sharpness.

SUMMARY OF THE INVENTION

The present inventors have made studies on the cell structure of the stimulable phosphor sheet and discovered that the partition should have a high reflectance to the stimulating rays by shortening its light-scattering length and should have a low absorbance for the stimulated emission by prolonging its light-absorption length for the stimulated emission, so that the diffusion of the stimulating rays on the plane of the phosphor sheet can be efficiently reduced to increase sharpness of the obtained radiation image and the decrease of emission efficiency can be effectively obviated by suppressing absorption of the stimulating rays as well as the stimulated emission. The inventors have further discovered that the stimulable phosphor-incorporated area should show a high transmittance for the stimulating rays by prolonging its light-scattering length and should have a low light-absorbance for the stimulated emission by prolonging the light-absorption length for the stimulated emission, so that the stimulating rays can reach the deep area of the stimulable phosphor sheet and the stimulated emission produced in the deep area can be efficiently recovered. Thus designed stimulable phosphor sheet gives a reproduced radiation image of high quality. Moreover, the stimulable phosphor sheet which has such characteristics and a large thickness gives a reproduced radiation image of increased high quality, increasing its sensitivity, namely, a ratio of absorption of radiation energy.

The invention resides in a stimulable phosphor sheet for a radiation image recording and reproducing method comprising the steps of recording a radiation image as a latent image, irradiating the latent image with stimulating rays to release stimulated emission, and electrically processing the emission to reproduce the radiation image, comprising partitions that divide the phosphor sheet on its plane to give plural sections, and stimulable phosphor-incorporated areas in the sections wherein the stimulable phosphor-incorporated areas have a light-scattering length of 20 to 100 $\mu$m and a light-absorption length of 1,000 $\mu$m or longer, while the partitions have a light-scattering length of 0.05 to 20 $\mu$m and a light-absorption length of 1,000 $\mu$m or longer, under the condition that a ratio of the light-scattering length of the stimulable phosphor-incorporated areas to that of the partitions is 3.0 or more.

The invention further resides in a radiation image recording and reproducing method comprising the steps of recording on a stimulable phosphor sheet of the invention a radiation image as a latent image, irradiating the latent image with stimulating rays to release stimulated emission, and electrically processing the emission to reproduce the radiation image.

In the present invention, the term of light-scattering length indicates a mean distance in which a light travels straight until it is scattered, and therefore a shorter light-scattering length means that the phosphor layer or partition highly scatters a light. The term of light-absorption length indicates a mean free distance in which the stimulated emission is absorbed, and therefore a longer light-absorption length means that the phosphor layer or partition shows a lower light absorbance.

The light-scattering length and light-absorption length can be determined by calculation according to Kubeluka-Munk theory. The details are given below.

First, three or more film samples are prepared. Each film sample has a different thickness, but made of the same material of the partition or the stimulable phosphor-incorporated area. The thickness ($\mu$m) and the diffuse transmittance (%) of each film sample are then measured. The diffuse transmittance (%) can be measured by means of a spectrophotometer equipped with an integrating sphere. In the below-described examples of the present specification, an automatic recording spectrophotometer (U-3210, manufactured by HITACHI, Ltd.) equipped with an integrating sphere of 150 $\phi$ (150–0910) is used. The diffuse transmittance should be measured at a wavelength corresponding to the maximum peak (for instance, 600 nm) of the stimulation spectrum of the stimulable phosphor in the stimulable phosphor-incorporated area, or at a wavelength corresponding to the maximum peak (for instance, 400 nm) of the stimulated emission spectrum of the stimulable phosphor.

From the thickness ($\mu$m) and the diffuse transmittance (%) obtained in the above-mentioned measurements, the light-scattering length and light-absorption length are calculated by the below-mentioned formulas which are derived from Kubeluka-Munk theory. For instance, the formulas can be easily derived, under the boundary condition of the diffuse transmittance (%), from the-formulas 5.1.12 to 5.1.15 described in "Keikotai Handbook [in Japanese, Handbook of phosphor]", published by Ohm-sha, 1987, pp.403.

In the beginning, light strength distribution I(Z) is calculated using a thickness (d $\mu$m) of a phosphor sheet, a reflectance ($d_0$) of the reflection sheet, a light-scattering length ($1/\alpha$) of the sample film, and a light-absorption length ($1/\beta$) of the sample film. I(Z) is then divided into i(Z) for a component advancing from the upper surface of the phosphor sheet and j(Z) for a component advancing from the lower surface to the upper surface of the phosphor sheet. Therefore, the relationship is written as follows:

$$I(Z) = i(Z) + j(Z)$$

Increase or decrease of strength by scattering/absorption at an optional depth in a film having a small thickness dz can be obtained by solving the following simultaneous differential equations according to Kubeluka-Munk theory:

$$di/dz = -(\beta + \alpha)i + \alpha j \tag{1}$$

$$dj/dz = (\beta + \alpha)j - \alpha i \tag{2}$$

Assuming the conditions of $\gamma^2 = \beta(\beta + 2\alpha)$, $\xi = (\alpha + \beta - \gamma)/\alpha$, $\eta = (\alpha + \beta + \gamma)/\alpha$, and K and L for integration constants, the general solutions for i and j of the simultaneous equations are described below:

$$i(z) = Ke^{-\gamma z} + Le^{\gamma z}$$

$$j(z) = K\xi e^{-\gamma z} + L\eta e^{\gamma z}$$

The light transmittance T of a phosphor sheet having a thickness d is described as follows:

$$T = i(d)/i(0)$$

Assuming that there is no returning light (namely, j(d)=0), a light transmittance T of the phosphor sheet alone is calculated in terms of a function of the thickness d, as follows:

$$T(d) = (\eta - \xi)/(\eta e^{\gamma z} - \xi e^{-\gamma z}) \tag{3}$$

The light transmittance data measured by means of a spectrophotometer and data of the phosphor sheet are processed according to the equation (3) and fitted by a method of least squares, to give an optimum $1/\alpha$ and $1/\beta$. Thus, the light-scattering length as well as the light-absorption length are determined.

The preferred stimulable phosphor sheets of the invention are given below.

(1) The stimulable phosphor-incorporated areas comprise stimulable phosphor particles and a binder.

(2) The stimulable phosphor particles in the stimulable phosphor-incorporated areas have a volume in the range of 40% to 90% of the phosphor-incorporated area, and the phosphor-incorporated areas have a void volume of 0 to 20%.

(3) The partitions of the stimulable phosphor sheet comprise low light-absorbing fine particles and a binder.

(4) The low light-absorbing fine particles in the partitions have a volume in the range of 30% to 90% of the partition.

(5) The low light-absorbing fine particles have a particle size of 0.01 to 5.0 μm.

(6) The low light-absorbing fine particles are fine particles of alumina.

(7) The partitions of the stimulable phosphor sheet further comprise voids.

(8) The partitions of the stimulable phosphor sheet further comprise voids in a volume of 10% to 70%.

(9) A ratio of refractive index of the low light-absorbing fine particles to that of the voids in the partitions is in the range of 1.1 to 3.0.

(10) The partitions further comprise stimulable phosphor particles.

(11) The partitions are dyed with a coloring material which absorbs the stimulating rays, while absorbs no stimulated emission.

(12) The stimulable phosphor sheet has a thickness in the range of 50 to 1,500 μm.

BRIEF DESCRIPTION OF DRAWINGS

FIG. 1-(1) is a schematic plane view of a stimulable phosphor sheet of the invention, and FIG. 1-(2) is a section view of the stimulable phosphor sheet of FIG. 1-(1) taken along I—I line.

FIGS. 4-(1), -(2), and -(3) are plane views showing different combinations of the stimulable phosphor-incorporated areas and the partition of the stimulable phosphor sheet of the invention.

FIGS. 5-(l), -(2), and -(3) are sectional views showing different embodiments of the stimulable phosphor sheet of the invention.

DETAILED DESCRIPTION OF THE INVENTION

The stimulable phosphor sheet having a cell structure according to the invention which has a combination of the partitions showing a short light-scattering length for stimulating rays and a long light-absorption length for stimulated emission and the stimulable phosphor-incorporated area showing a long light-scattering length for stimulating rays and a long light-absorption length for stimulated emission reproduces a radiation image of high sharpness, because diffusion of the stimulating rays on the plane of the phosphor sheet is effectively reduced. Further, the stimulating rays can reach a deep portion of the stimulable phosphor-incorporated area and the stimulated emission produced in the deep portion is efficiently recovered, because absorption of the stimulating rays and the stimulated emission by the partition is reduced. Accordingly, the total amount of recoverable stimulated emission is remarkably increased. Further, if the thickness of stimulable phosphor sheet is increased, the stimulable phosphor sheet can absorb an increased amount of the applied radiation such as X-rays, so that a radiation image of higher quality can be reproduced.

Therefore, the stimulable phosphor sheet of the invention is favorably employable particularly in radiography for clinical examination and for recording microscopic images.

The stimulable phosphor sheet of the invention is designed for the use in the aforementioned radiation image recording and reproducing method and is characterized by basically comprising partitions dividing the plane of the stimulable phosphor sheet into sections and stimulable phosphor-incorporated areas sectioned with that partitions. Each of the partitions and stimulable phosphor-incorporated areas has a light-scattering length and a light-absorption length specified above.

The stimulable phosphor sheet of the invention which has the partitions and stimulable phosphor-incorporated areas is described by referring to the attached drawings.

FIG. 1-(1) is a schematic plane view of a stimulable phosphor sheet 10 according to the invention. FIG. 1-(2) is a section view of the stimulable phosphor sheet 10 of FIG. 1-(1) taken along I—I line. In FIGS. 1-(1) and 1-(2), the shadowed portions represent partitions 11, and the areas enclosed with the partitions 11 represent the stimulable phosphor-incorporated areas 12. The stimulable phosphor sheet preferably has a thickness of 50 to 1,500 μm, so as to increase the radiation energy absorption efficiency. The stimulable phosphor-incorporated areas preferably have a mean size (of length and width on the plane) in the range of 5 to 300 μm, so as to accomplish an appropriate resolution and good image quality. The partitions preferably have a mean width in a range of 0.5 to 50 μm. A ratio of Sp (total surface area of all stimulable phosphor-incorporated areas) to S (total surface area of the stimulable phosphor sheet), namely Sp/S (i.e., ratio of opening area), preferably is 0.40 to 0.98 (40% to 98%)

In the stimulable phosphor sheet of the invention, the stimulable phosphor-incorporated area 12 shows a light-scattering length ($1/\alpha_1$) in the range of 20 to 100 μm for the stimulating rays and a light-absorption length ($1/\beta_1$) of 1,000 μm or more for the stimulated emission. The partition 11 shows a light-scattering length ($1/\alpha_2$) in the range of 0.05 to 20 μm for the stimulating rays and a light-absorption length ($1/\beta_2$) of 1,000 μm or more for the stimulated emission. Further, a ratio of the light-scattering length of the stimulable phosphor-incorporated area to the light-scattering length of the partition, namely $(1/\alpha_1)/(1/\alpha_2)$, is 3.0 or more.

The stimulable phosphor-incorporated area 12 preferably comprises stimulable phosphor particles and a binder in which the phosphor particles are dispersed and combined. More preferably, the phosphor-incorporated area 12 comprises stimulable phosphor particles, a binder, and voids (i.e., voids of air).

Figure 2:
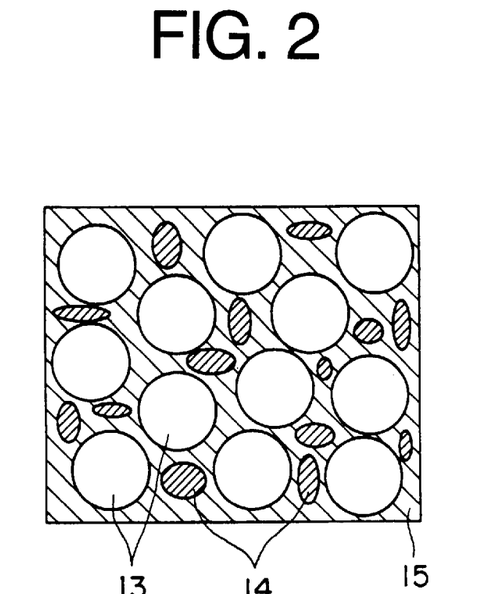
FIG. 2 is an enlarged view of the stimulable phosphor-incorporated areas of the stimulable phosphor sheet of the invention.

FIG. 2 is an enlarged view of the stimulable phosphor-incorporated area 12. The phosphor-incorporated area 12 comprises stimulable phosphor particles 13, voids 14, and a binder 15. A ratio of the volume ($Vp_1$) of stimulable phosphor particles 13 to the volume ($V_1$) of stimulable phosphor-incorporated area 12, namely $Vp_1/V_1$, preferably is in the range of 0.40 to 0.95 (i.e., 40% to 95%). A ratio of the volume ($Va_1$) of voids 14 to the volume ($V_1$) of stimulable phosphor-incorporated area 12, namely $Va_1/V_1$, preferably is in the range of 0 to 0.20 (i.e., 0% to 20%). The stimulable phosphor particles 13 preferably have a mean diameter of 1 to 10 μm.

Figure 3:
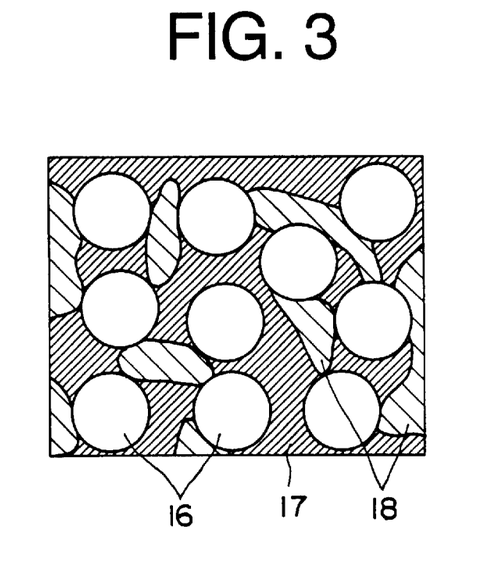
FIG. 3 is an enlarged view of the partition of the stimulable phosphor sheet of the invention.
Figure 4:
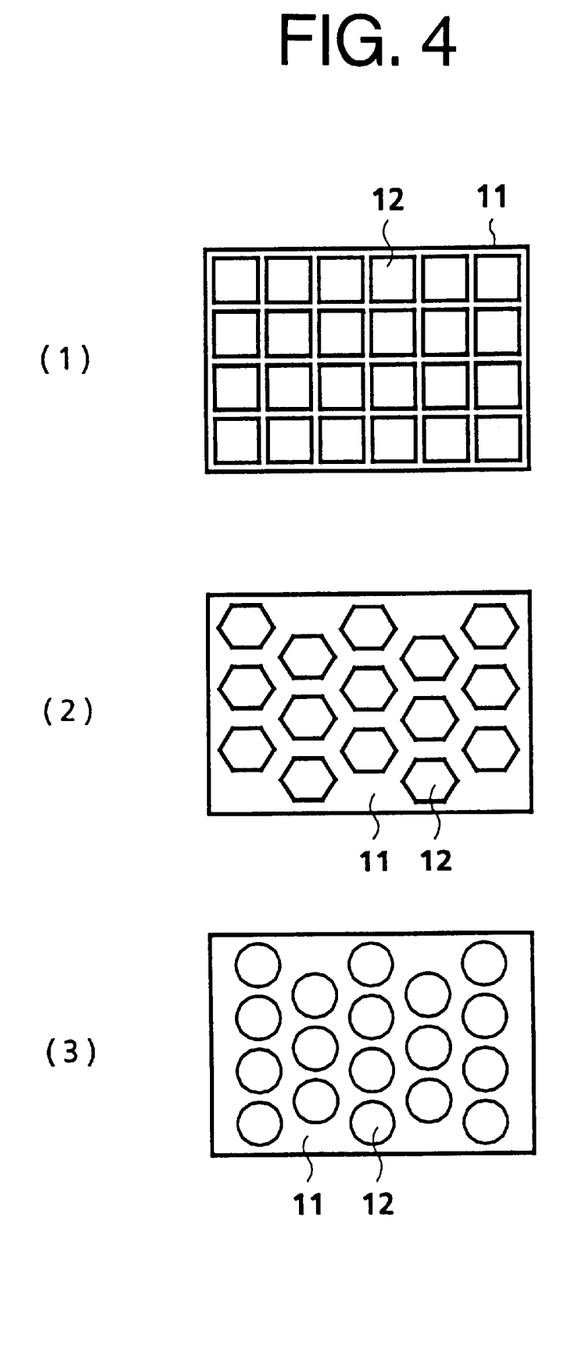
Figure 5:
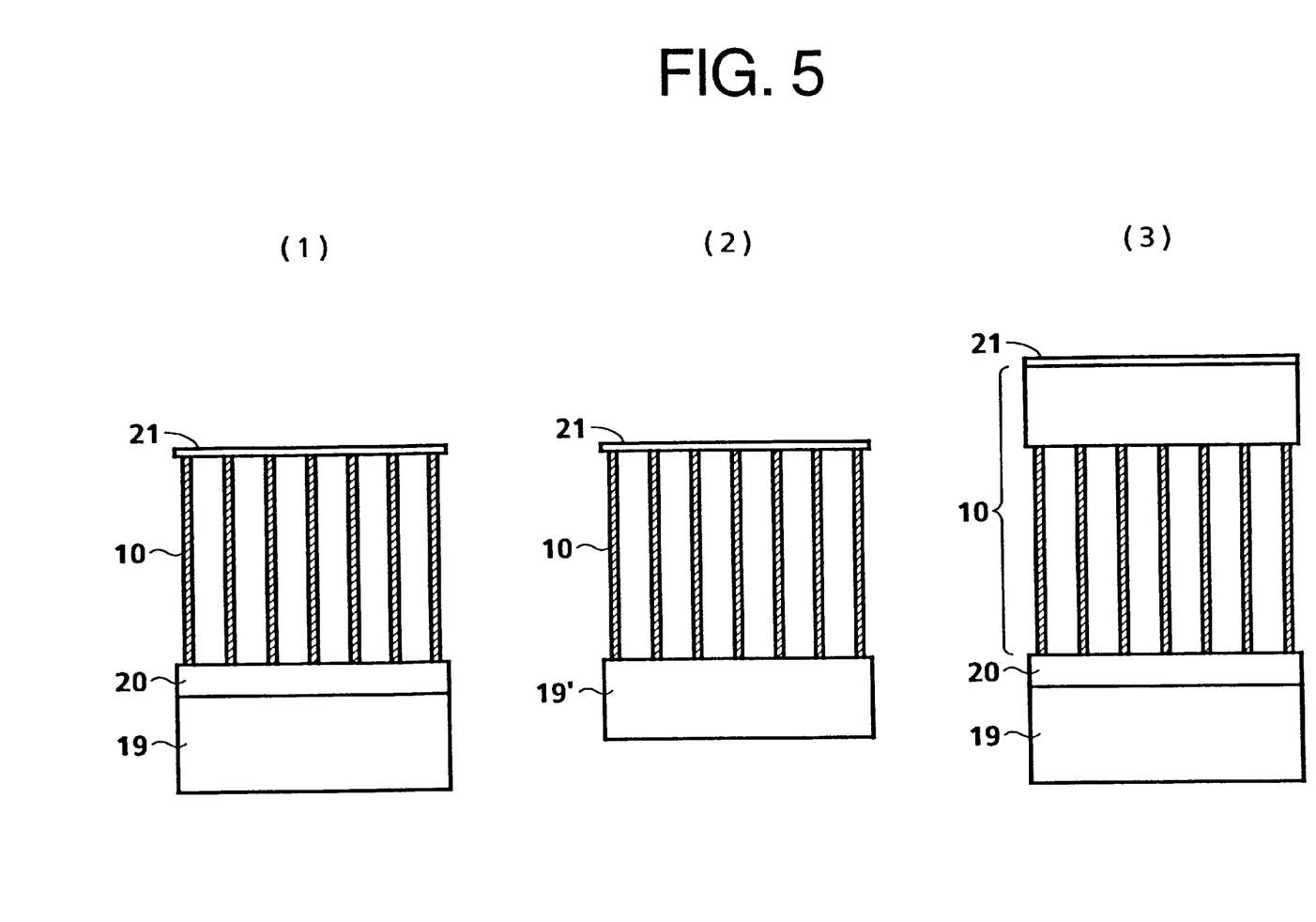

The partition 11 preferably comprises low light-absorbing fine particles and a polymer binder in which the particles are dispersed and supported. More preferably, the partition 11 comprises low light-absorbing fine particles, voids, and a polymer binder.

FIG. 3 is an enlarged view of the partition 11. The partition 11 comprises low light-absorbing fine particles 16, voids 17, and a polymer binder 18. A ratio of the volume ($Vf_2$) of low light-absorbing fine particles 16 to the volume ($V_2$) of partition 11, namely $Vf_2/V_2$, preferably is in the range of 0.30 to 0.90 (i.e., 30% to 90%). A ratio of the volume ($Va_2$) of voids 17 to the volume ($V_2$) of partition 11, namely $Va_2/V_2$, preferably is in the range of 0.10 to 0.70 (i.e., 10% to 70%). The low light-absorbing fine particles 16 preferably have a mean diameter of 0.01 to 5.0 μm. The low light-absorbing fine particles 16 preferably have a ratio of a refractive index Kf of the fine particles 16 to a refractive index Ka of voids 17, namely Kf/Ka, preferably is in the range of 1.1 to 3.0.

Figure 1:
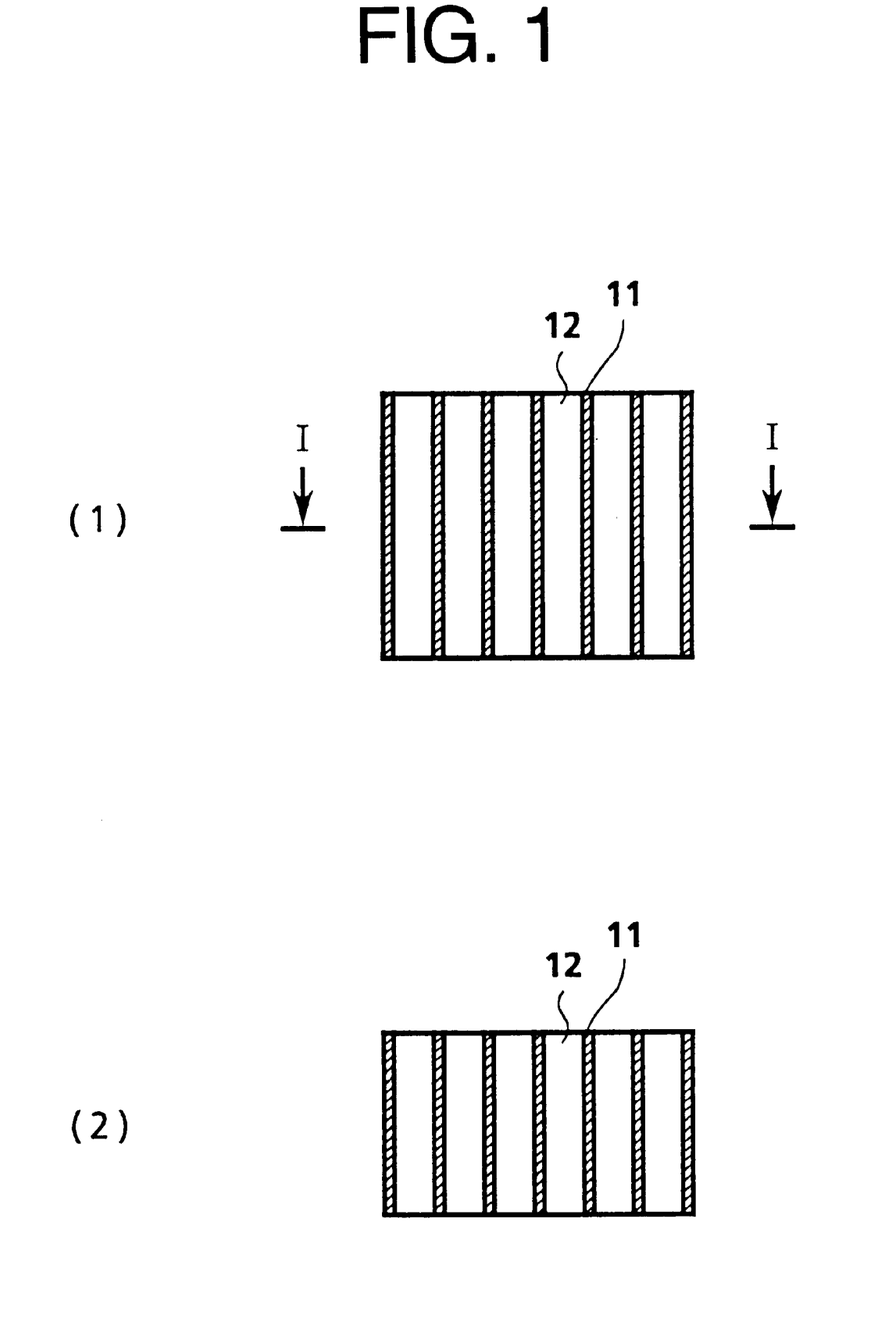

The cell structure of the stimulable phosphor sheet of the invention may be a one-dimensionally striped structure comprising partitions 11 and stimulable phosphor-incorporated areas 12 which are alternately arranged side by side, as illustrated in FIG. 1. The cell structure, however, can be prepared in other forms with respect to the shapes and positions of the partitions. The stimulable phosphor sheet illustrated in FIG. 1 is advantageously scanned with stimulating rays in a direction traversing the striped partitions 11 and phosphor areas 12 when the radiation image is read out.

FIGS. 4-(1), -(2) and -(3) show variations of the partitions. In FIG. 4-(1), the partitions 11 is two-dimensionally formed to give a grid partition. In FIG. 4-(2), a hexagonal stimulable phosphor-incorporated areas 12 str enclosed with a partition 11 to give a two dimensionally formed cells. In FIG. 4-(3), a circular stimulable phosphor-incorporated area 12 are enclosed with a partition 11 to give a two dimensionally formed cells.

In FIG. 1, the top and bottom of the partition 11 are exposed over the surfaces of the stimulable phosphor sheet. However, the top and/or bottom of the partition 11 may be buried in the stimulable phosphor sheet. The partition preferably has a height corresponding to 1/3 to 1/1 of the thickness of the stimulable phosphor sheet.

The stimulable phosphor sheet of the invention can be prepared by the following process. The process is described for a stimulable phosphor sheet comprising stimulable phosphor-incorporated areas (composed of stimulable phosphor particles, voids, and binder) and partitions (composed of low light-absorbing fine particles, voids, and binder).

As the stimulable phosphor incorporated into the stimulable phosphor-incorporated areas, a phosphor giving a stimulated emission of a wavelength in the range of 300 to 500 nm when it is irradiated with stimulating rays of a wavelength in the range of 400 to 900 nm is preferably employed. In Japanese Patent Provisional Publications No. 2-193100 and No. 4-310900, some examples of the stimulable phosphors are described in detail. Examples of the preferred stimulable phosphors include divalent europium or cerium activated alkaline earth metal-halide phosphors (e.g., BaFBr:Eu, BaFBrI:Eu), and cerium activated oxyhalide phosphors.

Examples of the binders include natural polymers such as proteins (e.g., gelatin), polysaccharides (e.g., dextran) and gum arabic; and synthetic polymers such as polyvinyl butyral, polyvinyl acetate, nitrocellulose, ethyl cellulose, vinylidene chloride-vinyl chloride co-polymer, polyalkyl (meth)acrylate, vinyl chloride-vinyl acetate copolymer, polyurethane, cellulose acetate butyrate, polyvinyl alcohol, linear polyester, and thermoplastic elastomers. These may be crosslinked with a cross-linking agent.

Examples of the solvents employable for preparing the phosphor dispersion include lower aliphatic alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower aliphatic alcohols with lower aliphatic acids such as methyl acetate, ethyl acetate and butyl acetate; ethers such as dioxane, ethylene glycol monoethyl ether, ethylene glycol monomethyl ether and tetrahydrofuran; and mixtures of the above-mentioned compounds.

The ratio between the binder and the phosphor in the phosphor dispersion depends on the characteristics of the stimulable phosphor and the desired property of the stimulable phosphor sheet, but generally they are incorporated at a ratio of 1:1 to 1:100 (binder:phosphor, by weight), preferably 1:8 to 1:40. The phosphor dispersion may further contain various additives such as dispersing agents (for assisting the phosphor particles in dispersing), plasticizers (for increasing the bonding between the binder and the phosphor particles), anti-yellowing agents (for inhibiting yellowing of the phosphor layer), hardening agents, and/or crosslinking agents.

Examples of the low light-reflective fine particles are fine particles of inorganic materials such as aluminum oxide (i.e., alumina), yttrium oxide, gadolinium oxide, titanium dioxide,.tellurium oxide. Certain stimulable phosphor particles may be employed as the low light-absorbing fine particles. Preferred are alumina particles. The low light-absorbing fine particles preferably have a mean particle diameter of 0.01 to 50 μm. The low light-absorbing fine particles preferably has a ratio of a refractive index Kf of the fine particles to a refractive index Ka of voids, namely Kf/Ka, preferably is in the range of 1.1 to 3.0.

There are no specific limitation with respect to the polymer binder for production of the partitions, and the binders described hereinbefore for the production of the stimulable phosphor-incorporated area can be employed. In order to shorten the light-scattering length of the partition, a ratio of Kf (i.e., refractive index of the low light-absorbing fine particles) to the refractive index of the polymer binder preferably is in the range of 1.1 to 3.0. Therefore, the polymer binder preferably is polyurethane, polyacrylate, polyethylene, or a fluororesin.

For the production of the partitions, a dispersion is prepared by mixing the low light-absorbing fine particles and the polymer binder in a solvent. The solvent may be chosen from those described hereinbefore for the preparation of a dispersion for producing the stimulable phosphor-incorporated area. The polymer binder and the low light-absorbing fine particles are mixed generally in a ratio of 1:80 to 1:3 (by weight), preferably 1:20 to 1:10 (by weight). The ratio can be varied depending on the desired characteristics of the target stimulable phosphor sheet and the nature of the low light-absorbing fine particles.

The stimulable phosphor sheet of the invention can be produced, for example, by the steps of beforehand preparing a sheet of partition material having a honeycomb structure composed of many hollows or holes, filling the hollows or holes with a dispersion of stimulable phosphor particles in a binder solution, and then drying the filled dispersion. The stimulable phosphor sheet of the invention can be also produced in the following manner. First, the low light-absorbing fine particles are dispersed in a thermosetting resin and processed to form a sheet of honey-comb structure. The honey-comb sheet is then pushed into a plastic stimulable phosphor sheet which is beforehand prepared. In the course of pushing the honey-comb sheet, the plastic stimulable phosphor sheet may be heated and/or pressed.

The stimulable phosphor sheet having a honey-comb structure can be also formed, for example, by lithography such as dry-etching process. Japanese Patent Provisional Publication No. 62-36599 describes a dry-etching process employable for the preparation of the stimulable phosphor sheet of the invention. Further, LIGA process and etching process using a laser (e.g., excimer laser) are also employable.

The stimulable phosphor sheet of the invention can be prepared from plural stimulable phosphor films and plural low light-absorbing fine particle-containing films by laminating and slicing process.

In more detail, a stimulable phosphor sheet of the invention having a grid partition can be produced by a process comprising the steps of:

(i) producing plural stimulable phosphor films and plural partition films which contain a low light-absorbing fine particles;

(ii) forming a multi-layered composite block in which the stimulable phosphor films and the partition films are alternately piled up under the condition that neighboring phosphor films and partition films would be placed in close contact with each other;

(iii) repeatedly slicing the multi-layered composite block in the direction perpendicular to the plane of the piled films, to prepare plural striped phosphor films in which strips of the phosphor films and partition films are alternately arranged;

(iv) forming another multi-layered composite block in which the striped phosphor films and the partition films are alternately piled up under the condition that neighboring striped films and partition films would be placed in close contact with each other; and (v) slicing repeatedly the multi-layered composite block formed in the step (iv) in the direction perpendicular to the plane of the piled films, so as to give the desired stimulable phosphor sheet.

A ratio of the volume of voids in the stimulable phosphor-incorporated area or in the partition can be adjusted to give the desired value, for instance, by appropriately compressing the stimulable phosphor sheet or the partition sheet by means of a calendaring treatment under heating.

The stimulable phosphor-incorporated area and the partition may not contain the polymer binder. In more detail, the partition film of honey-comb structure can be produced by sintering the low light-absorbing fine particles or deposition of low light-absorbing material. The stimulable phosphor-incorporated area can be produced by placing starting material of the stimulable phosphor in the honey-comb structure of the partition film and sintering the material of the stimulable phosphor in the honey-comb structure, or depositing the stimulable phosphor in the honey-comb structure of the partition film.

The stimulable phosphor-incorporated area may not contain voids, so long as it shows the specific light-scattering length and light-absorption length. The partition also may not contain voids and can consist essentially of low light-absorbing fine particles and a polymer binder. Otherwise, the voids are filled with a liquid organic material (liquid at room temperature) such as silicone oil or a fluorine atom-containing compound. The partition may further contain a stimulable phosphor so as to enhance the sensitivity of the stimulable phosphor sheet. The partition may be dyed with a coloring material absorbing the stimulating rays but not absorbing the stimulated emission, so as to increase the sharpness of the resulting radiation image. An appropriate coloring material is described, for instance, in Japanese Patent Publication No. 59-23400.

The stimulable phosphor sheet of the invention may have a support and a protective film, so as to keep the phosphor sheet from deterioration and to facilitate handling of the phosphor sheet. The stimulable phosphor sheet also can have a light-reflective layer on one surface side (or between the phosphor sheet and the support, if the support is provided), so as to increase the sensitivity of the phosphor sheet.

In FIG. 5-(1), the stimulable phosphor sheet of FIG. 1-(1) is provided on its lower side with a support 19 and a light-reflective layer 20 and on its upper side with a protective layer 21. In FIG. 5-(2), the stimulable phosphor sheet is provided on its lower side with a transparent support 19' and on its upper side with a protective layer 21. The stimulable phosphor sheet of FIG. 5-(2) is favorably employable in the known double side-reading system in which the stimulated emission is collected from the both surface sides of the phosphor sheet. In FIG. 5-(3), the stimulable phosphor sheet is provided on its lower side with a support 19 and a light-reflective layer 20 and on its upper side with a protective layer 21. The tops of the partitions are buried in the stimulable phosphor sheet 10.

As the support, a sheet or a film of flexible resin material having a thickness of 50 $\mu$m to 1 mm is generally employed. The support may be transparent or may contain light-reflecting material (e.g., alumina particles, titanium dioxide particles, and barium sulfate particles) or voids, for reflecting the stimulating rays or the stimulated emission. Further, it may contain light-absorbing material (e.g., carbon black) for absorbing the stimulating rays or the stimulated emission. Examples of the resin materials include polyethylene terephthalate, polyethylene naphthalate, aramid resin and polyimide resin. The support may be a sheet of other material such as metal, ceramics and glass, if needed. On the phosphor sheet-side surface of the support, auxiliary layers (e.g., light-reflecting layer, light-absorbing layer, adhesive layer, electroconductive layer) or many hollows may be provided. On the other side surface, a friction-reducing layer or an anti-scratch layer may be formed.

On the surface not facing the support, the stimulable phosphor sheet may have a protective film. In order not to affect the simulating rays or the stimulated emission, the protective film preferably is transparent. Further, for efficiently protecting the stimulable phosphor sheet from chemical deterioration and physical damage, the protective film should be both chemically stable and physically strong.

The protective film can be provided by fixing a beforehand prepared transparent plastic film (e.g., polyethylene terephthalate) on the stimulable phosphor sheet with adhesive, or by coating the phosphor sheet with a solution of protective film material and drying the coated solution. Into the protective film, fillers of fine particles may be incorporated so as to reduce blotches caused by interference and to improve the quality of the resultant radiation image. The thickness of the protective film generally is in the range of approx. 0.1 to 20 $\mu$m.

For enhancing the resistance to staining, a fluororesin layer is preferably provided on the protective film. The fluororesin layer can be formed by coating the surface of the protective film with a solution of a fluororesin in an organic solvent, and drying the coated solution. The fluororesin may be used singly, but generally a mixture of the fluororesin and a film-forming resin is employed. In the mixture, an oligomer having polysiloxane structure or perfluoroalkyl group can be further added. The coating can be performed using known coating means such as doctor blade, roll coater, and knife coater. Into the fluororesin layer, a filler of fine particles may be incorporated so as to reduce blotches caused by interference and to improve quality of the resultant radiation image. The thickness of fluororesin layer generally is in-the range of 0.5 to 20 $\mu$m. In the formation of the fluororesin layer, additives such as a crosslinking agent, a film-hardening agent and an anti-yellowing agent can be used. In particular, the crosslinking agent advantageously improves durability of the fluororesin layer.

The light-reflective layer can comprise a white pigment such as alumina pigment, titanium dioxide pigment, or a barium sulfate pigment, or phosphor particles giving no stimulated emission. In the light-reflective layer, the pigment or particles are dispersed and supported in a binder.

The present invention is further described by the following examples.

EXAMPLE 1

1) Preparation of Stimulable Phosphor Sheets for Stimulable Phosphor-incorporated Area Particles of stimulable phosphor (BaFBr:Eu, particle sizes: 5 $\mu$m) and a thermoplastic high molecular weight polyester resin (binder) were dispersed in methyl ethyl ketone in a weight ratio of 5:1, to prepare a phosphor dispersion having a viscosity of 30 PS (at 25° C.). The phosphor dispersion was then coated on a temporary support having a releasing surface by means of a coating apparatus, and dried to give a dry phosphor layer. The phosphor layer thus formed was then peeled from the temporary support to give a stimulable phosphor film. The stimulable phosphor film was compressed under heating by means of a calendaring apparatus to reduce its void volume.

The above-mentioned preparatory procedures were repeated to prepare various stimulable phosphor sheets (volume of phosphor: 52%, void volume: 3%, thickness: approx. 20 to 100 $\mu$m) for the production of stimulable phosphor-incorporated areas.

2) Preparation of Partition Films

Alumina fine particles (particle size: 1.0 $\mu$m) and a high molecular weight-acryl resin were dispersed in methyl ethyl ketone in a weight ratio of 15:1, to prepare a alumina dispersion having a viscosity of 30 PS (at 25° C.). The alumina dispersion was coated on a temporary support having a releasing surface by means of a coating apparatus, and dried to give a dry alumina-containing layer. The alumina-containing layer thus formed was then peeled from the temporary support to give an alumina-containing film.

The above-mentioned preparatory procedures were repeated to prepare various alumina-containing films (volume of alumina particles: 51%, void volume: 38%, ratio of refractive index (alumina particles/void): 1.67, thickness: approx. 10 to 30 $\mu$m) for the production of partitions.

3) Preparation of Stimulable Phosphor Sheets

Each of the Stimulable Phosphor Film (thickness: 100 $\mu$m) and the alumina-containing film (thickness: 10 $\mu$m) was cut to give square pieces (40 mm×40 mm). Thus prepared pieces of the stimulable phosphor films and the alumina-containing films were alternately piled up to form a multi-layered composite consisting of 360 layers. The composite was then heated under pressure to produce a multi-layered composite block. The multi-layered composite block was repeatedly sliced in a direction perpendicular to the layer plane with a wide microtome, to produce stimulable phosphor sheets having one-dimensionally striped phosphor cell structure (thickness: 200 to 1,000 $\mu$m).

5) Preparations of other Stimulable Phosphor Sheets

The above-mentioned procedures were repeated except for replacing the partition film of 20 $\mu$m thick with a partition film of 30 $\mu$m, to produce stimulable phosphor sheets of striped phosphor cell structure (thickness: 200 to 1,000 $\mu$m).

COMPARISON EXAMPLE 1

The procedures of Example 1 for the preparation of a phosphor sheet were repeated except for changing the weight ratio of the stimulable phosphor to binder to 20/1, to prepare a phosphor dispersion for preparing a stimulable phosphor sheet. The phosphor dispersion was coated on a temporary support having a releasing surface by means of a coating apparatus, and dried to give a dry phosphor layer. The phosphor layer was then peeled from the temporary support to give a stimulable phosphor film. The stimulable phosphor film was compressed under heating by means of a calendaring apparatus to give a stimulable phosphor sheet having no cell structure (thickness: 200 to 1,000 $\mu$m).

COMPARISON EXAMPLE 2

The procedures of Example 1 were repeated except for replacing the alumina-containing partition film with a polyethylene terephthalate film (thickness: 6 $\mu$m) on which aluminum metal was vacuum-deposited to prepare various stimulable phosphor sheets having a one-dimensionally striped phosphor cell structure (thickness: 200 to 1,000 $\mu$m).

EXAMPLES 2 to 9

The procedures of Example 1 for the preparation of a stimulable phosphor sheet were repeated except for changing the weight ratio of the stimulable phosphor to binder as set forth in Table 1. Further, the procedures of Example 1 for the preparation of a partition film were repeated except for changing the weight ratio of the alumina fine particles to the acryl resin as set forth in Table 1.

Thus, there were prepared various stimulable phosphor sheets having a one-dimensionally striped phosphor cell structure (thickness: 200 to 1,000 $\mu$m).

COMPARISON EXAMPLES 3 to 6

The procedures of Example 1 for the preparation of a stimulable phosphor sheet were repeated except for changing the weight ratio of the stimulable phosphor to binder as set forth in Table 1. Further, the procedures of Example 1 for the preparation of a partition film were repeated except for changing the weight ratio of the alumina fine particles to the acryl resin as set forth in Table 1.

Thus, there were prepared various stimulable phosphor sheets having a one-dimensionally striped phosphor cell structure (thickness: 200 to 1,000 $\mu$m).

EXAMPLE 10

Plural partition films (thickness: 10 $\mu$m) and a multi-layered composite block were prepared in the manner as described in Example 1. The composite block was repeatedly sliced by means of a wide microtome to produce plural stimulable phosphor sheets of one-dimensionally striped phosphor cell structure (thickness: 100 μm). Thus prepared stimulable phosphor sheets and the partition films were alternately piled up to form a multi-layered composite consisting of 200 layers. The composite was then heated under pressure to produce a multi-layered composite block. Thus produced multi-layered composite block was repeatedly sliced by means of a wide microtome, to produce stimulable phosphor sheets having a one-dimensionally striped phosphor cell structure (thickness: 200 μm, 600 μm, 1,000 μm).

The procedures of Example 1 for the preparation of a phosphor sheet were repeated except for changing the weight ratio of the stimulable phosphor to binder as set forth in Table 1. Further, the procedures of Example 1 for the preparation of a partition film were repeated except for changing the weight ratio of the alumina fine particles to the acryl resin as set forth in Table 1.

Thus, there were prepared various stimulable phosphor sheets having a one-dimensionally striped phosphor cell structure (thickness: 200 to 1,000 μm).

EVALUATION OF STIMULABLE PHOSPHOR SHEET

Each of various stimulable phosphor sheets for preparing the stimulable phosphor-incorporated area and F=-- various partition films was spectroscopically measured in its transmittance at a wavelength of 600 nm (i.e., wavelength of typical stimulating rays) as well as at a wavelength of 400 nm (i.e., wavelength of typical stimulated emission). The measured transmittance was incorporated into the aforementioned equation (3) according to the Kubeluka-Munk theory to calculate the light-scattering length and the light-absorption length. The light-absorption length of the stimulable phosphor-incorporated area and the partition of the stimulable phosphor sheets of Examples 1 to 10 was more than 1,000 μm. Other results are set forth in Tables 1 and 2, in which "scat." stands for "scattering".

Each of the stimulable phosphor sheets of Examples 1 to 10 and Comparison Examples 1 to 6 was exposed to X-rays of 80 kVp (dosage: 10 mR) and scanned-with He-Ne laser beam. The stimulated emission was then detected to evaluate the sensitivity from the luminance of stimulated emission. Further, the sharpness (CTF at 2 lp) was obtained from the resulting image data for evaluating the image quality. The results are graphically illustrated in FIGS. 6 to 9.

TABLE 1

| | Phosphor/Binder (weight ratio) | Phosphor-incorporated area | | Alumina/resin (weight ratio) | Partition | |
|---|---|---|---|---|---|---|
| | | scat. | width | | scat. | width |
| Example 1 | 5/1 | 66 μm | 100 μm | 15/1 | 4 μm | 10 μm |
| Example 1 | 5/1 | 66 μm | 100 μm | 15/1 | 4 μm | 20 μm |
| Example 1 | 5/1 | 66 μm | 100 μm | 15/1 | 4 μm | 30 μm |
| Example 2 | 10/1 | 20 μm | 100 μm | 15/1 | 4 μm | 30 μm |
| Example 3 | 7/1 | 40 μm | 100 μm | 15/1 | 4 μm | 30 μm |
| Example 4 | 5/1 | 66 μm | 100 μm | 7/1 | 15 μm | 10 μm |
| Example 5 | 5/1 | 66 μm | 100 μm | 7/1 | 15 μm | 20 μm |
| Example 6 | 5/1 | 66 μm | 100 μm | 7/1 | 15 μm | 30 μm |
| Example 7 | 5/1 | 66 μm | 100 μm | 5/1 | 20 μm | 10 μm |
| Example 8 | 5/1 | 66 μm | 100 μm | 5/1 | 20 μm | 20 μm |
| Example 9 | 5/1 | 66 μm | 100 μm | 5/1 | 20 μm | 30 μm |
| Example 10 | 5/1 | 66 μm | 100 μm | 15/1 | 4 μm | 10 μm |
| Com. Ex. 1 | 20/1 | 11 μm | — | — | — | — |
| Com. Ex. 2 | 5/1 | 66 μm | 100 μm | — | — | 6 μm |
| Com. Ex. 3 | 20/1 | 11 μm | 100 μm | 15/1 | 4 μm | 30 μm |
| Com. Ex. 4 | 5/1 | 66 μm | 100 μm | 4/1 | 25 μm | 10 μm |
| Com. Ex. 5 | 5/1 | 66 μm | 100 μm | 4/1 | 25 μm | 20 μm |
| Com. Ex. 6 | 5/1 | 66 μm | 100 μm | 4/1 | 25 μm | 30 μm |

Figure 6:
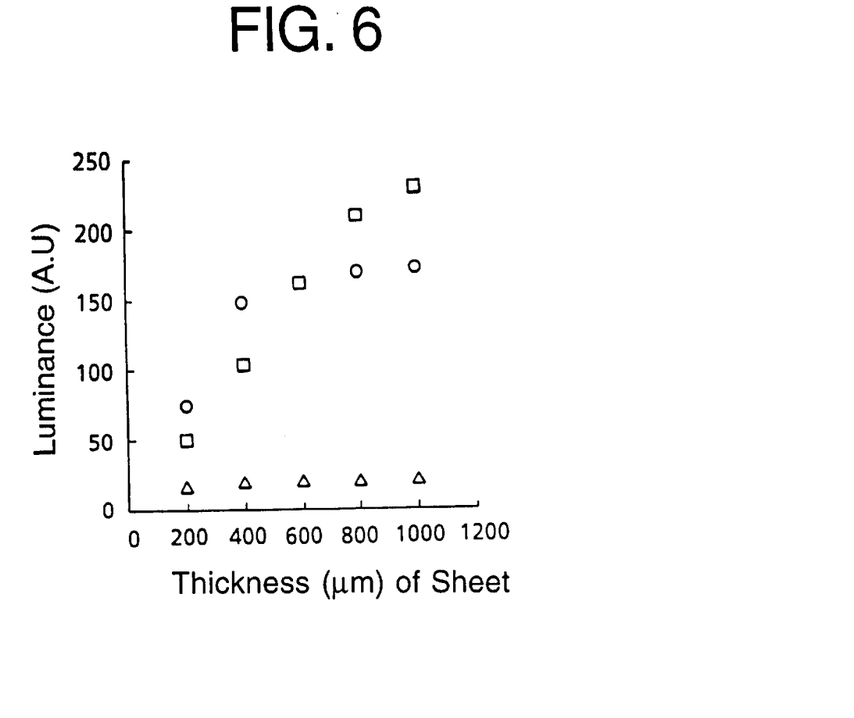
FIG. 6 graphically indicates a relationship of the thickness of the stimulable phosphor sheet and the luminance (in terms of relative value) of the stimulated emission in the case that the partition has a thickness of 30 μm.

FIG. 6 graphically indicates a relationship between the thickness of the stimulable phosphor sheet and the luminance of the stimulated emission (in terms of relative value) in the stimulable phosphor sheets of Example 1 and Comparison Examples 1 and 2, under the condition that the partition has a width of 30 μm. In the graph, the square marks are for Example 1, the circular marks are for Comparison Example 1, and the triangle marks are for Comparison Example 2.

Figure 7:
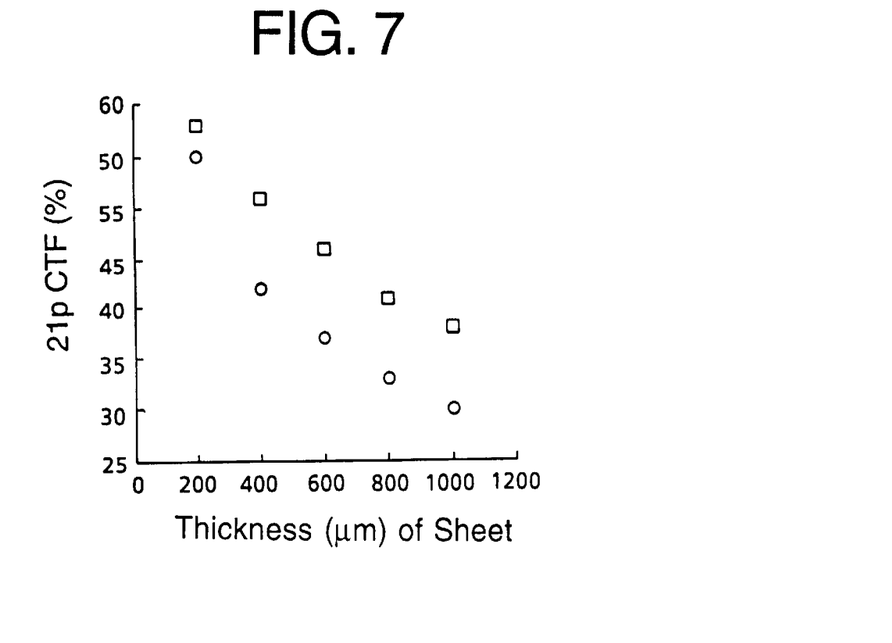
FIG. 7 graphically indicates a relationship of the thickness of the stimulable phosphor sheet and the sharpness (in terms of 2 lp·CTF) in the case that the partition has a thickness of 30 μm.

FIG. 7 graphically indicates a relationship between the thickness of the stimulable phosphor sheet and the sharpness (2 lp·CTF) in the stimulable phosphor sheets of Example 1 and Comparison Example 1, under the condition that the partition has a width of 30 μm. In the graph, the square marks are for Example 1 and the circular marks are for Comparison Example 1.

Figure 8:
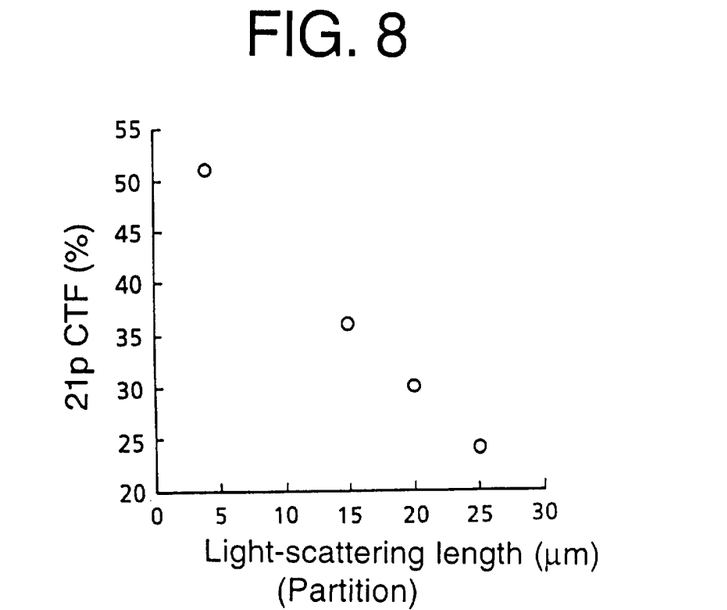
FIG. 8 graphically indicates a relationship of the light-scattering length of the partition and the sharpness (in terms of 2 lp·CTF) in the case that the stimulable phosphor-incorporated area has a light-scattering length of 66 μm and the stimulable phosphor sheet has a thickness of 40 μm.

FIG. 8 graphically indicates a relationship between the light-scattering length of the partition and the sharpness (2 lp·CTF) in the stimulable phosphor sheets of Examples 1 to 9 and Comparison Examples 4 to 6, under the condition that the stimulable phosphor-incorporated area has a light-scattering length of 66 μm and the stimulable phosphor sheet has a thickness of 400 μm.

Figure 9:
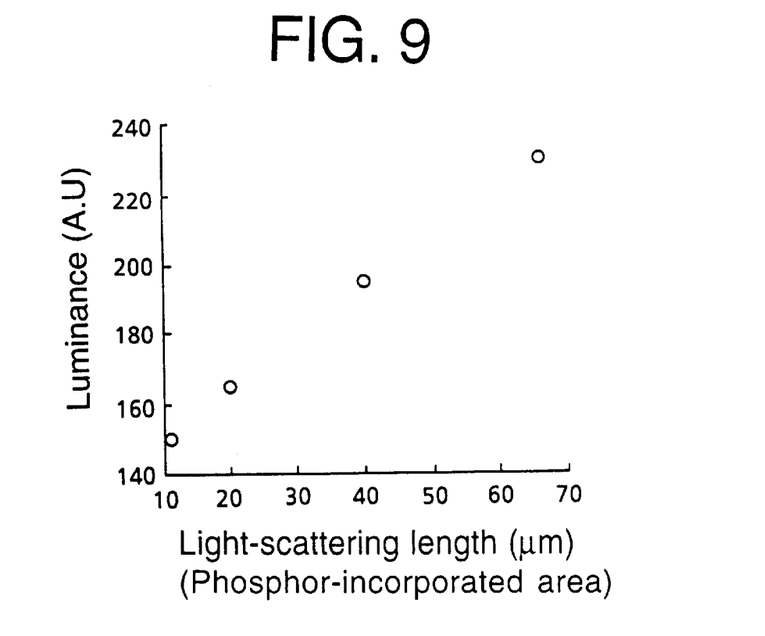
FIG. 9 graphically indicates a relationship of the light-scattering length of the partition and the luminance (in terms of relative value) of the stimulated emission in the case that the partition has a light-scattering length of 4 μm and a thickness of 30 μm.

FIG. 9 graphically indicates a relationship between the light-scattering length of the stimulable phosphor-incorporated area and the luminance of the stimulated emission (in terms of relative value) in the stimulable phosphor sheets of Examples 1 to 9 and Comparison Example 3, under the condition that the partition has a light-scattering length of 4 μm and a width of 30 μm, and the stimulable phosphor sheet has a thickness of 1,000 μm.

The results illustrated in FIG. 6 indicate that the conventional stimulable phosphor sheet (Comparison Example 1) having no cell structure has a high density of the phosphor and shows a short light-scattering length, but that although this phosphor sheet shows a relatively high luminance of the stimulated emission when the thickness of the phosphor sheet is small, the luminance does not proportionally increase with the increase of the thickness of the phosphor sheet. The known stimulable phosphor sheet (Comparison Example 2) having a cell structure shows a light-absorption of approx. 15 to 20% because the partition having a mirror surface is made of metallic material. The luminance of the stimulated emission detected from the stimulable phosphor sheet of Comparison Example 2 is low regardless of variation of the thickness of the stimulable phosphor sheet.

In contrast, the stimulable phosphor sheet (Example 1) according to the invention shows a low density value of stimulable phosphor particles due to the presence of the partition, and gives the stimulated emission at a low luminance when the thickness of the stimulable phosphor sheet is small. However, when the thickness of the phosphor sheet is increased, the luminance increases almost proportionally. This is because the stimulable phosphor-incorporated area shows a long light-scattering length, and hence the stimulating rays can reach the deep portion of the phosphor-incorporated area even when the thickness of the phosphor sheet increases, and the stimulated emission is efficiently recovered. Further, the extreme long light-absorption length of the partition serves to extremely reduce absorption of the stimulated emission by the partition.

FIG. 7 indicates that the stimulable phosphor sheet of the invention (Example 1) gives a radiation image of high sharpness which is less decreased when the thickness of the phosphor sheet is increased, as compared with the conventional stimulable phosphor sheet having no cell structure (Comparison Example 1). In the stimulable phosphor sheet of the invention, the partition having a short light-scattering length keeps the stimulating rays from diffusing on the plane of the phosphor sheet.

FIG. 8 indicates that a partition having a longer light-scattering length is less effective to keep the stimulating rays from diffusing on the plane of the phosphor sheet and hence decreases the sharpness of the resulting radiation image.

FIG. 9 indicates that the luminance of the stimulated emission increases when the light-scattering length of the stimulable phosphor-incorporated area increases in the case that the stimulable phosphor sheet has a thickness as much as 1,000 $\mu$m. This is because that the stimulating rays reach the deep portion of the stimulable phosphor-incorporated area to increase the amount of stimulated emission and the stimulated emission is well recovered.

EXAMPLE 11

A stimulable phosphor sheet having a cell structure (thickness: 600 $\mu$m, width of partition : 30 $\mu$m) was prepared in the same manner as described in Example 1, except that the alumina fine particles (diameter: 1.0 $\mu$m), BaFBr:Eu phosphor particles (diameter: 5.0 $\mu$m), and a high molecular weight-acrylate resin in a ratio of 7.5/7.5/1 (by weight) were added to methyl ethyl ketone.

Thus prepared stimulable phosphor sheet was measured in the same manner to give a light-scattering length of 6 $\mu$m and a light-absorption length of more than 1,000 $\mu$m. The luminance of the stimulated emission and the sharpness (in terms of CTF) were measured in the same manner. The stimulable phosphor sheet having a partition containing stimulable phosphor particles shows a high luminance of the stimulated emission which increases by 9% in comparison with the stimulable phosphor sheet of Example 1, while shows a decrease of CTF by 3%.

The above-mentioned results suggest that the sensitivity of a stimulable phosphor sheet having a cell structure is remarkably increased with slight decrease of the sharpness by incorporating a stimulable phosphor into the partition.

EXAMPLE 12

A stimulable phosphor sheet having a cell structure (thickness: 600 $\mu$m, width of partition : 10 $\mu$m) was prepared in the same manner as described in Example 1, except that the partition sheet was prepared by adding 500 mg of ultramarine to 100 g of alumina fine particles.

Thus prepared stimulable phosphor sheet shows a sharpness (in terms of CTF) higher than that of the stimulable phosphor sheet of Example 1 by 10%, while the decrease of the luminance of the stimulated emission is 6%.

The above-mentioned results suggest that the sharpness can be increased with little decrease of the sensitivity, by coloring the partition with a dye which absorbs the stimulating rays but does not absorb the stimulated emission.

What is claimed is:

1. A stimulable phosphor sheet for a radiation image recording and reproducing method comprising the steps of recording a radiation image as a latent image, irradiating the latent image with stimulating rays to release stimulated emission, and electrically processing the emission to reproduce the radiation image, comprising partitions that divide the phosphor sheet on its plane to give plural sections, and stimulable phosphor-incorporated areas placed in the sections wherein the stimulable phosphor-incorporated areas have a light-scattering length of 20 to 100 $\mu$m for the stimulating rays and a light-absorption length of 1,000 $\mu$m or longer for the stimulatined emission, while the partitions have a light-scattering length of 0.05 to 20 $\mu$m for the stimulating rays and a light-absorption length of 1,000 $\mu$m or longer for the stimulated emission, under the condition that a ratio of the light-scattering length of the stimulable phosphor-incorporated areas to that of the partitions is 3.0 or more.

2. The stimulable phosphor sheet of claim 1, wherein the stimulable phosphor-incorporated areas comprise stimulable phosphor particles and a binder.

3. The stimulable phosphor sheet of claim 2, wherein the stimulable phosphor particles have a volume in the range of 40% to 95% of the phosphor-incorporated area, and the phosphor-incorporated areas have a void volume of 0 to 20%.

4. The stimulable phosphor sheet of claim 1, wherein the partitions comprise low light-absorbing fine particles and a binder.

5. The stimulable phosphor sheet of claim 4, wherein the low light-absorbing fine particles have a volume in the range of 30% to 90% of the partition.

6. The stimulable phosphor sheet of claim 4, wherein the low light-absorbing fine particles have a particle size of 0.01 to 5.0 $\mu$m.

7. The stimulable phosphor sheet of claim 4, wherein the low light-absorbing fine particles are fine particles of alumina.

8. The stimulable phosphor sheet of claim 4, wherein the partitions further comprise voids.

9. The stimulable phosphor sheet of claim 8, wherein a ratio of refractive index of the low light-absorbing fine particles to that of the voids is in the range of 1.1 to 3.0.

10. The stimulable phosphor sheet of claim 4, wherein the partitions further comprise voids in a volume of 10% to 70%.

11. The stimulable phosphor sheet of claim 4, wherein the partitions further comprise stimulable phosphor particles.

12. The stimulable phosphor sheet of claim 4, wherein the partitions are dyed with a coloring material which absorbs the stimulating rays, while absorbs no stimulated emission.

13. The stimulable phosphor sheet of claim 4, which has a thickness in the range of 50 to 1,500 $\mu$m.

14. A radiation image recording and reproducing method comprising the steps of recording on a stimulable phosphor sheet a radiation image as a latent image, irradiating the latent image with stimulating rays to release stimulated emission, and electrically processing the emission to reproduce the radiation image, the stimulable phosphor sheet comprising partitions that divide the phosphor sheet on its plane to give plural sections, and stimulable phosphor-incorporated areas placed in the sections, wherein the stimulable phosphor-incorporated areas have a light-scattering length of 20 to 100 $\mu$m for the stimulating rays and a light-absorption length of 1,000 $\mu$m or longer for the stimulated emission, while the partitions have a light-scattering length of 0.05 to 20 $\mu$m for the stimulating rays and a light-absorption length of 1,000 $\mu$m or longer for the stimulated emission, under the condition that the ratio of the light-scattering length of the stimulable phosphor-incorporated areas to that of the partitions is 3.0 or more.

* * * * *